United States Patent
Skarp

[11] Patent Number: 5,873,552
[45] Date of Patent: Feb. 23, 1999

[54] SNOWMOBILE STAND

[76] Inventor: Romney Skarp, 211 Tarry Town Rd., Big Lake, Minn. 55309

[21] Appl. No.: 976,909

[22] Filed: Nov. 24, 1997

[51] Int. Cl.[6] .................................................. F16M 11/00
[52] U.S. Cl. .................... 248/161; 248/125.8; 248/354.5
[58] Field of Search .............................. 248/161, 125.8, 248/354.5, 354.4, 354.1, 354.6, 354.7, 351

[56] References Cited

U.S. PATENT DOCUMENTS

| | | | |
|---|---|---|---|
| 2,514,095 | 7/1950 | Schreiber | 248/354.6 X |
| 2,882,012 | 4/1959 | Luna | 254/133 |
| 2,973,184 | 2/1961 | Trautman et al. | 254/123 |
| 3,830,455 | 8/1974 | Brightly | 248/352 |
| 3,834,669 | 9/1974 | Reid | 254/133 |
| 4,042,202 | 8/1977 | Molinari | 248/354.5 X |
| 4,479,634 | 10/1984 | Blatz | 254/133 R |
| 4,540,147 | 9/1985 | Lincourt | 248/351 X |
| 4,811,924 | 3/1989 | Walter | 248/352 |
| 4,856,747 | 8/1989 | Gano | 248/354.7 |

*Primary Examiner*—Ramon O. Ramirez
*Attorney, Agent, or Firm*—Haugen and Nikolai, P.A.

[57] ABSTRACT

A snowmobile stand is provided for elevating the snowmobile motor driven track. The stand has a generally A-shaped base with an elongated member bent to form a V-shape and having an apex and two opposing spaced-apart legs. A transverse member extends between these two legs. A snowmobile support extends vertically from the A-shaped base. The support includes a channel member at its upper end for receiving the rear bumper of a snowmobile and a rectangular shield plate. This channel member has a generally planar base with angled front and rear walls. The channel member is located at the top of a selectively adjustable inner tube member positioned within a sleeve member. This inner tube member can telescope within the sleeve member to a desired height. Once at the desired height, the inner tube member is fastened to the sleeve member. The sleeve member removably secured to the base and thus can be removed from the base to enable storage of the snowmobile stand in a generally flat arrangement.

12 Claims, 1 Drawing Sheet

SNOWMOBILE STAND

FIELD OF THE INVENTION

The present invention relates to vehicle supports and more particularly to an adjustable support stand for a snowmobile.

BACKGROUND OF THE INVENTION

A snowmobile is a popular winter recreational vehicle consisting of a rear motor driven track located under the snowmobile frame and steerable skies extending forward from the snowmobile frame. The motor driven track is an endless belt trained over a series of rollers. The motor driven track provides the main riding surface of the snowmobile and it includes cleats to assist in gripping the snow and/or ice covered ground surface.

Maintenance and repair work is necessary to keep a snowmobile in operating condition. In order to perform maintenance on the motor driven track, the snowmobile must be lifted to elevate the track from the ground surface. This is commonly accomplished by raising the rear of the snowmobile while keeping the forward skies on the ground surface. Another method requires lifting the entire snowmobile off the ground surface. Once the track has been elevated from the ground surface, repair work such as adjusting the belt tracking, repairing the motor or belt and the like can be accomplished. Such work and maintenance often requires running the now-elevated motor driven track. Snow, ice and even cleats from the snowmobile track can be thrown from the belt as the belt is operated in an elevated manner, and thus the worker and surroundings must be protected from the thrown objects to prevent injury and damage.

Various prior art stands are available, such as that shown in U.S. Pat. No. 3,830,455 to Brightly. However, the stand of the Brightly patent is not adjustable. Since snowmobiles come in different sizes, a smaller snowmobile may be lifted too high, placing greater strain on the forward skis. This can create an unstable arrangement, especially when the track is run in the elevated position. Alternatively, a larger snowmobile may not be lifted sufficiently for maintenance or repair purposes. Thus, there is a need for an adjustable height stand to lift different size snowmobiles off the ground along with the additional ability to readily dismantle the device for storage purposes, such as found in the present invention.

SUMMARY OF THE INVENTION

The present invention is a stand used to elevate the rear end of the snowmobile. By lifting the snowmobile's rear end including the motor driven belt, the belt can be run during tune-ups, repairs and the like maintenance. The stand has a generally A-shaped base adapted to rest on the ground. The base may be formed by bending steel tubing to a V-shape and then welding a transverse member, made from the same steel tubing, to form the A configuration.

Affixed to the transverse member is a U-shaped bracket. A sleeve is welded to the side of the U-shaped bracket and projects upward from the bracket. The bracket is fastened to the transverse member by conventional fasteners such as a locking pin arrangement. The sleeve has aligned holes near its upper end for receiving a transversely extending locking pin. Positioned telescopically within the center of the sleeve is a length of tubing of corresponding shape but of a lesser size. The inner tube has a plurality of pairs of aligned holes which correspond with the aligned holes on the sleeve. A channel is welded to the upper end of the inner tube and is adapted to receive the rear bumper of a snowmobile. The height of the channel is determined by which holes on the inner tube are aligned with the sleeve holes through which a locking pin is placed to secure the position.

A shield plate is welded to the sleeve and extends across the width of the stand base, which is preferably greater than the width of the snowmobile track. The shield plate has a generally rectangular configuration with its side edges angled in towards where the snowmobile will be positioned. This allows the shield plate to partially encompass the rear area of the snowmobile track. The shield plate thus is able to stop snow, ice and possibly cleats which may be thrown from the snowmobile's track as it is run for repair and maintenance purposes.

The stand is easily taken apart for storage purposes. The fasteners securing the U-shaped bracket to the transverse member of the base are removed and the U-shaped bracket is lifted off the transverse member of the base. The inner tube is collapsed down completely within the sleeve member and secured in place with the locking pin extending transversely through the aligned holes. The stand can then be readily stored in a flat manner.

The primary object of the present invention is to provide a snowmobile stand that has a vertically adjustable member for receiving a snowmobile bumper and thereby lift the snowmobile's motor driven track off the ground surface to a desired height allowing the motor to be run during maintenance and repair.

Another object of the present invention is to provide an adjustable snowmobile stand for lifting the snowmobile motor driven track off the ground surface that includes a shield for deflecting snow, ice or track cleats thrown from the track as it is run in the lifted position and thus preventing injury or damage from the thrown ice, snow or track cleats.

A further object of the present invention is to have a snowmobile stand that can accommodate a variety of different sized snowmobiles by adjustment of a vertical member supporting the rear bumper of the snowmobile.

Another object of the present invention is to provide a snowmobile stand that can be readily dismantled for easy storage.

DESCRIPTION OF THE DRAWINGS

These and other objects and advantages of the present invention will become readily apparent to those skilled in the art from the review of the following detailed description of the preferred embodiment especially when considered in conjunction with the accompanying drawing.

DETAILED DESCRIPTION OF THE PREFERRED EMBODIMENT

Figure 1:
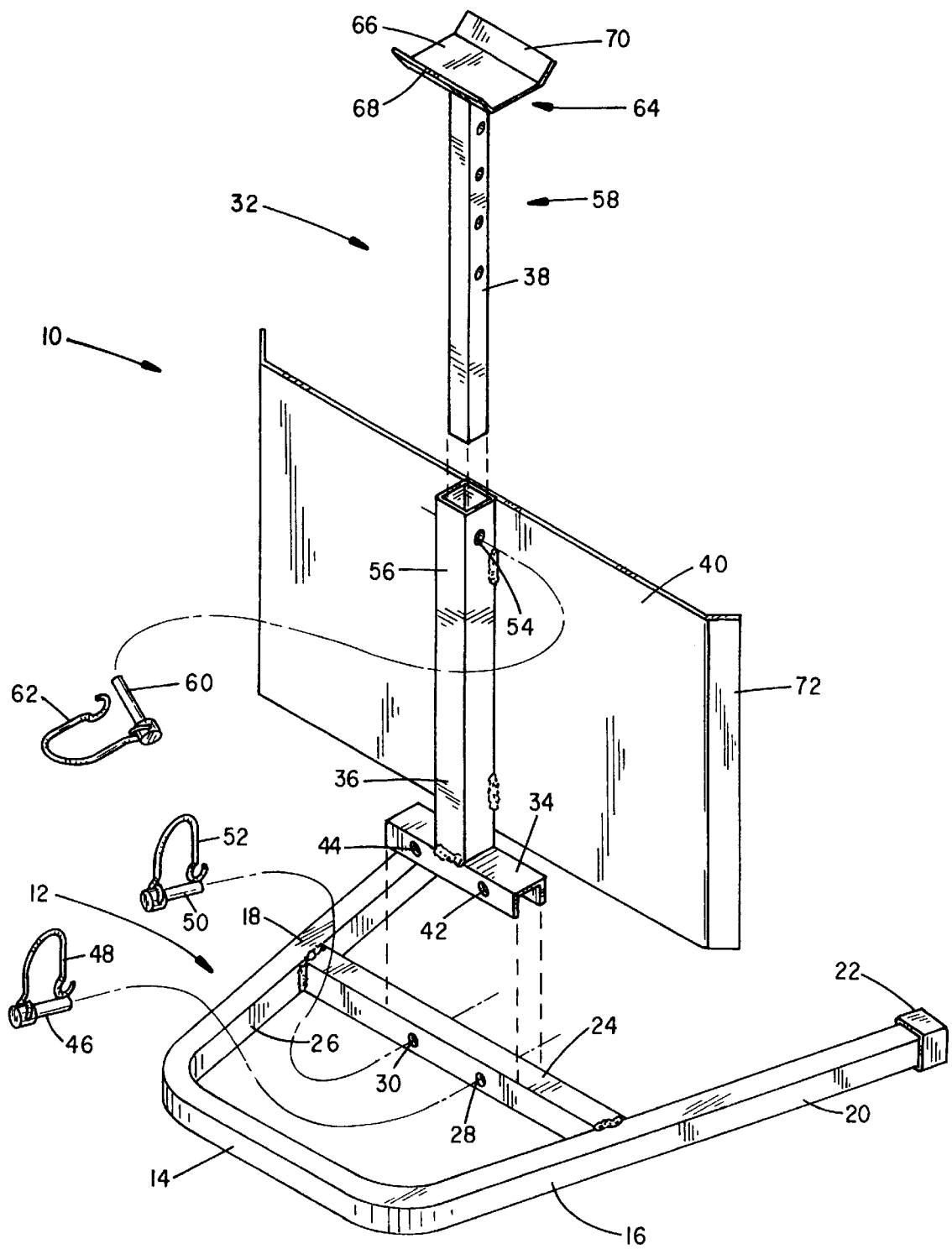
FIG. 1 is an exploded perspective view of the present invention.

The present invention is a snowmobile stand 10 and is shown in exploded form in FIG. 1. The stand 10 includes a generally A-shaped base 12, preferably made from 1×1 steel tubing bent to form an elongated arcuate member with an apex 14 and legs 16 and 18. The ends of each leg has a plastic end cap, one of which is shown on end 20 as end cap 22. The end cap 22 prevents snow and other debris from entering the interior of the tubing and also covers the sharp edge of the tubing for safety concerns. Completing the A-shaped base is a transverse member 24 that is preferably welded to the inside surfaces 26 of legs 16 and 18. The transverse base member 24 further includes holes, two of which are designated 28 and 30, for mounting the height adjustable snowmobile bumper rest 32 as will be described in greater detail.

The height adjustable snowmobile bumper rest 32 includes a U-shaped bracket 34, a sleeve 36, a corresponding inner tube member 38 and a shield 40. The U-shaped bracket 34 is sized to fit over the transverse base member 24. Mounting holes, two of which are designated 42 and 44, corresponding to the holes 28 and 30 of the transverse base member 24 are located on bracket 34. A pin 46 is received through holes 28 and 42 and secured with a locking loop 48. Likewise, pin 50 is received through holes 30 and 44 and is secured with a locking loop 52.

Welded or otherwise affixed to the U-shaped bracket 24 is the vertical sleeve member 36. The sleeve member 36 is arranged to project vertically from the A-shaped base and has a pair of aligned mounting holes, one of which is designated 54, at its upper end 56. Positioned within the vertical sleeve member is the inner tube member 38. The inner tube member 38 is free to telescope within the sleeve member 36. A plurality of mounting holes, designated generally as 58, are spaced along the inner tube member 38. These holes 58 correspond with the mounting holes 54 found on the sleeve member 36. This allows for height adjustment of the stand 10. The inner tube 38 is moved to the desired height and then a locking pin 60 is inserted through the corresponding holes on the inner tube member 38 and sleeve member 36 and secured with a corresponding locking loop 62. While both tubes are shown to have a square configuration, other configurations which allow the inner tube to telescope within the sleeve member are also acceptable.

A channel configured bumper support 64 is affixed to the top of the inner tube member 38. This support is configured to receive the bumper of a snowmobile. The support 64 has a base 66 and an angled front wall 68 and an angled rear wall 70 for accommodating a bumper of a snowmobile.

The shield plate, 40 is mounted to the sleeve member 36, preferably by welding. This shield 40 acts as a snow, ice and track cleat deflector. The shield 40 is generally rectangular and extends across the width of the stand. This is preferably wider than the snowmobile track so that it can intercept debris thrown from the track when being driven by the vehicle's engine, such as during tune-ups. The deflector also has two angled end edges 72 and 74 enabling the shield to partially surround the path of any object thrown from track as it is operated in the elevated position.

The entire assembly is preferably zinc yellow plated to inhibit rusting and to enhance its overall appearance.

The operation of the device is straight forward. The bumper rest 32 is secured to the base 12 by mounting U-shaped bracket 34 over the transverse base member 24 and securing pins 46 and 50 with locking loops 48 and 52, respectively. The inner tube member 38 is moved within sleeve 36 until it is at the desired height, with a pair of holes on the inner tube 38 aligned with aligned holes, one of which is designated 54, on the sleeve member 36. Locking pin 60 is then inserted transversely through the aligned holes and secured with locking loop 62. The stand is now ready for a bumper of a snowmobile to be set into the support 64, with the snowmobile being on the side of the base 12 as its apex 14. After the stand 10 has been used, it can be readily taken apart for storage purposes. The locking pin 60 is removed, the inner tube 38 is taken out or inserted into the sleeve member 36. If it is kept in the sleeve member 36, it can be secured with the locking pin 60. The bracket 34 is then removed from the transverse base member 24. The stand can now be stored and transported in a generally flat, compact arrangement.

This invention has been described herein in considerable detail in order to comply with the patent statutes and to provide those skilled in the art with the information needed to apply the novel principles and to construct and use such specialized components as are required. However, it is understood that the invention can be carried out by specifically different equipment and devices, the various modifications, both as to the equipment and operating procedures, can be accomplished without departing from the scope of the invention itself.

What is claimed is:

1. A snowmobile stand for elevating a snowmobile's motor driven track off the ground, said snowmobile stand comprising:
   (a) a generally A-shaped base having an elongated, generally V-shaped member with two opposing spaced apart legs and a transverse member extending between said two legs;
   (b) a snowmobile support extending vertically from said A-shaped base, said snowmobile support having:
      (i) a bracket for selectively securing said support to said transverse member;
      (ii) a sleeve member secured to said bracket;
      (iii) a selectively adjustable internal tube member positioned within said sleeve member;
      (iv) a channel member at a free end of said selectively adjustable internal tube member;
      (v) a first fastening means for selectively securing said internal tube to said sleeve member; and
   (c) a generally rectangular shield plate secured to said sleeve member.

2. A snowmobile stand of claim 1 wherein said sleeve member has a first pair of holes aligned with each other and said internal tube member has a plurality of holes whereby selected holes of said plurality of holes are aligned with said first pair of holes for receiving said first fastening means therethrough.

3. A snowmobile stand of claim 1 and further including a second fastening means for removably securing said bracket to said transverse member.

4. A snowmobile stand of claim 1 wherein said channel member has a generally planar base, an outwardly angled front wall and an outwardly angled rear wall.

5. A snowmobile stand of claim 1 wherein said first fastening means is a locking pin.

6. A snowmobile stand of claim 1 wherein said second fastening means is a locking pin.

7. A snowmobile stand for elevating a snowmobile motor driven track, said snowmobile stand comprising:
   (a) a generally A-shaped base having an elongated, generally V-shaped member with an apex, two opposing spaced apart legs extending from said apex and a transverse member extending between said two legs and welded thereto;
   (b) a snowmobile support extending vertically from said A-shaped base, said snowmobile support having:
      (i) a u-shaped bracket for selectively securing said support to said transverse member;
      (ii) a square tube sleeve member secured to said u-shaped bracket;
      (iii) a selectively adjustable internal square tube member telescopically positioned within said square tube sleeve member;

(iv) a channel member affixed to a free end of said selectively adjustable internal square tube member;

(v) a first fastening means for selectively securing said internal square tube member to said square tube sleeve member at a desired degree of extension of the internal square tube member from the sleeve member; and (c) a generally rectangular shield plate secured to said square tube sleeve member.

8. A snowmobile stand of claim 7 wherein said square tube sleeve member has a first pair of holes aligned with each other and said internal square tube member has a plurality of aligned hole pairs whereby selected hole pairs of said plurality are aligned with said first pair of holes for receiving said first fastening means therethrough.

9. A snowmobile stand of claim 7 and further including a second fastening means for removably securing said u-shaped bracket to said transverse member.

10. A snowmobile stand of claim 7 wherein said channel member has a generally planar base, an outwardly angled front wall and an outwardly angled rear wall.

11. A snowmobile stand of claim 7 wherein said first fastening means is a locking pin.

12. A snowmobile stand of claim 7 wherein said second fastening means is a locking pin.

* * * * *